Nov. 20, 1962  F. J. PILIA ET AL  3,065,330
WELDING MACHINE AND PROCESS
Filed July 24, 1961  8 Sheets-Sheet 2
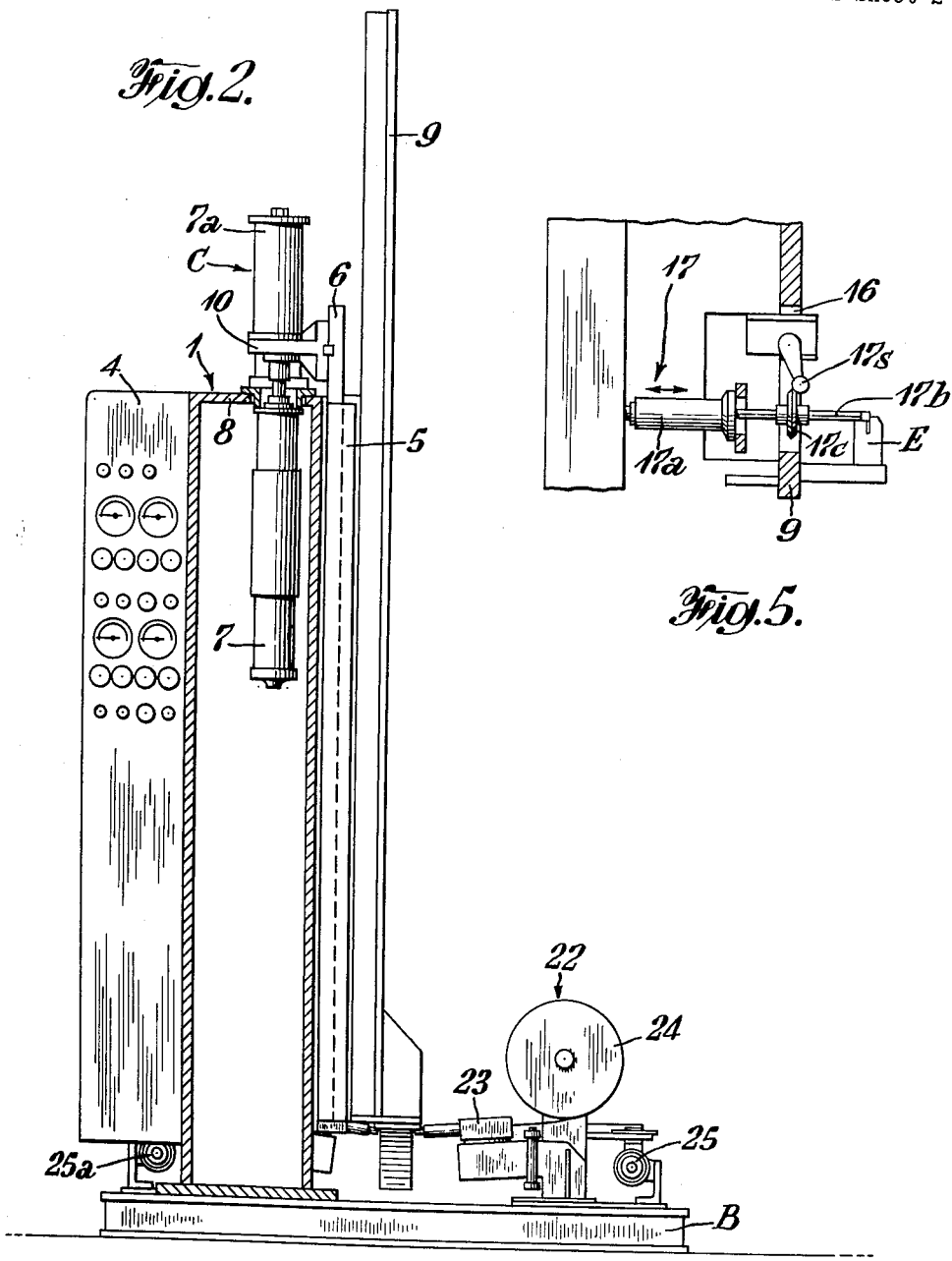
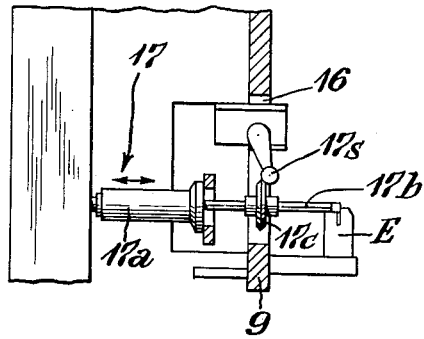
INVENTORS
FRANK J. PILIA
LESTER J. O'BRIEN
BY William F. Mesinger
ATTORNEY

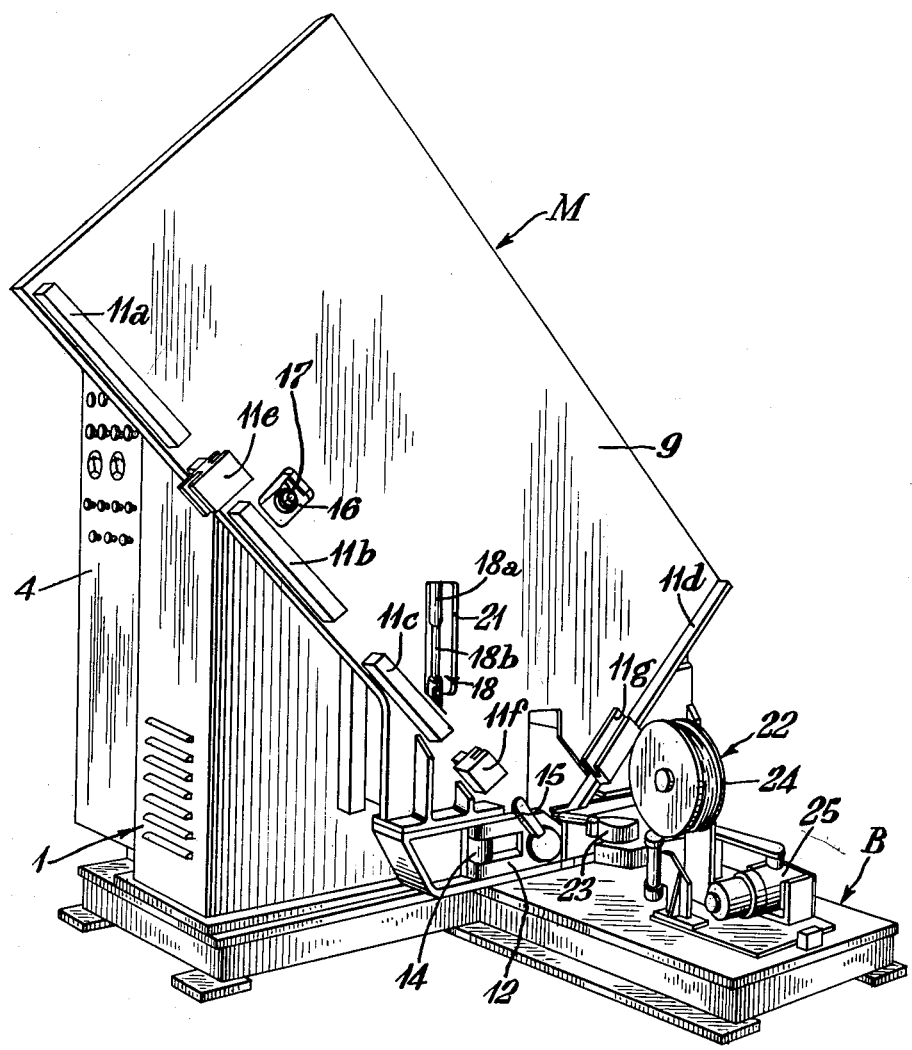

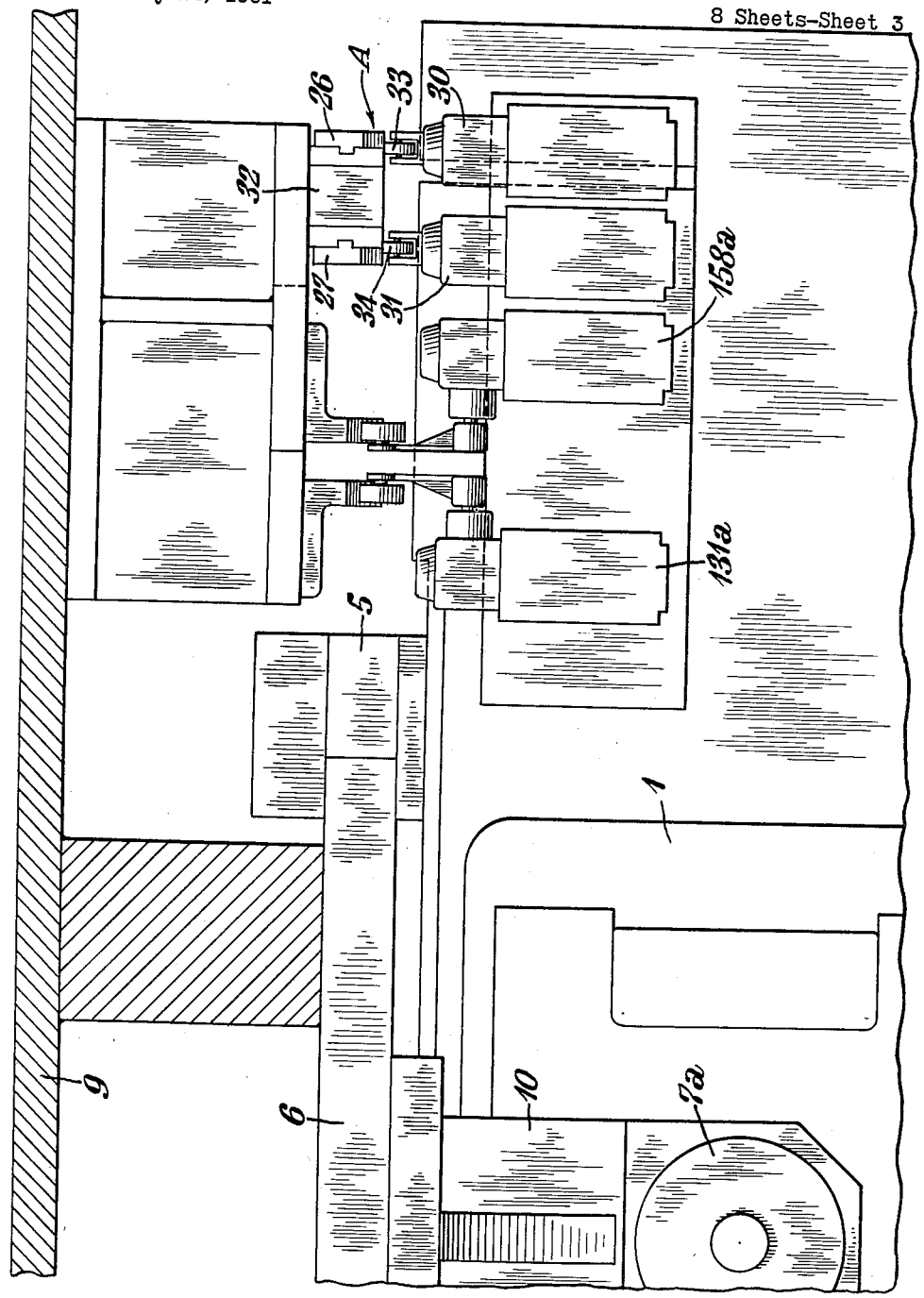

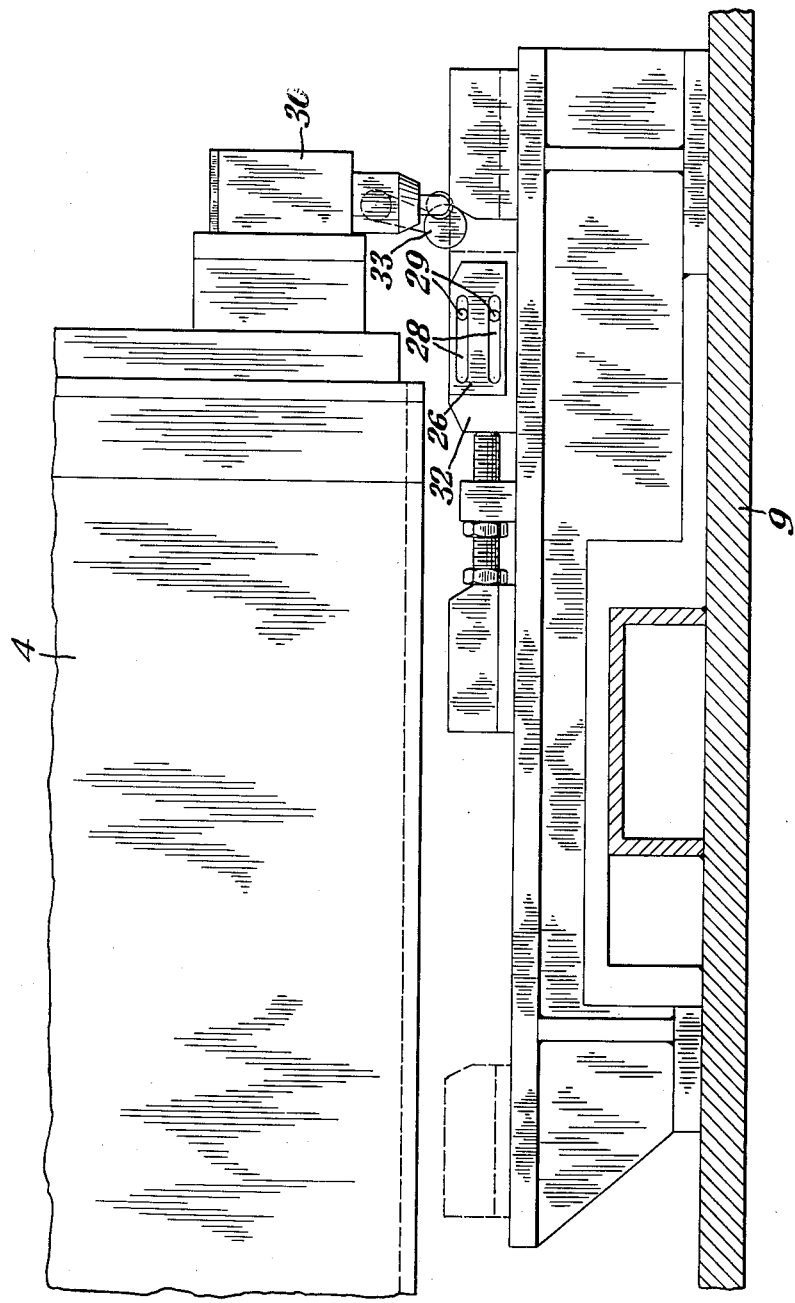

Nov. 20, 1962　　　F. J. PILIA ET AL　　　3,065,330
WELDING MACHINE AND PROCESS
Filed July 24, 1961　　　　　　　　　　　　　　8 Sheets-Sheet 5

INVENTORS
FRANK J. PILIA
LESTER J. O'BRIEN

BY William F. Mesinger
ATTORNEY

Nov. 20, 1962  F. J. PILIA ET AL  3,065,330
WELDING MACHINE AND PROCESS
Filed July 24, 1961  8 Sheets-Sheet 7

INVENTORS
FRANK J. PILIA
LESTER J. O'BRIEN

BY William F. Mesinger
ATTORNEY

Nov. 20, 1962    F. J. PILIA ET AL    3,065,330
WELDING MACHINE AND PROCESS
Filed July 24, 1961
8 Sheets-Sheet 8
Without The Inventive System
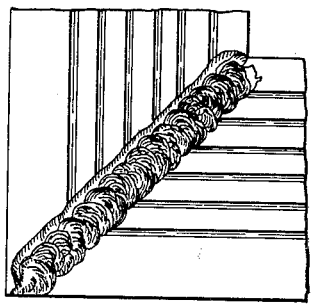
Fig.10a.    Front
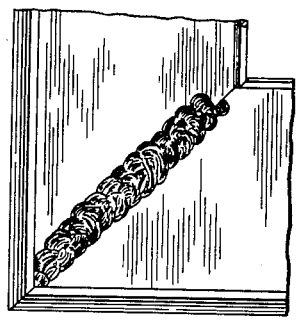
Rear    Fig.10b
With The Inventive System
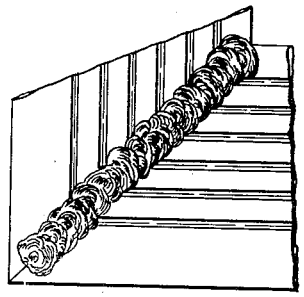
Fig.10c.    Front
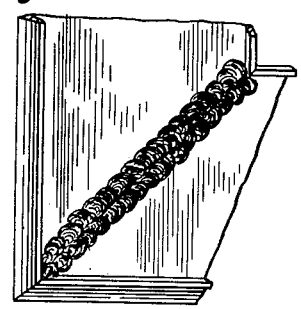
Rear    Fig.10d.
Without The Inventive System
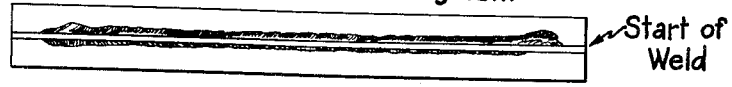
Start of Weld
Fig.11a
With The Inventive System
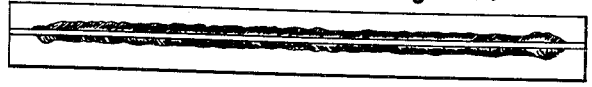
Fig.11b.
INVENTORS
FRANK J. PILIA
LESTER J. O'BRIEN
BY William F. Messinger
ATTORNEY

United States Patent Office 3,065,330
Patented Nov. 20, 1962

3,065,330
WELDING MACHINE AND PROCESS
Frank J. Pilia, West Orange, and Lester J. O'Brien, South Orange, N.J., assignors to Union Carbide Corporation, a corporation of New York
Filed July 24, 1961, Ser. No. 126,220
6 Claims. (Cl. 219—124)

This invention relates to an arc welding machine and process and more particularly to such machine and process for welding corner seams formed between two metallic members to be joined, as for example the corners of aluminum doors.

The manufacture of aluminum door frames from hollow extruded shapes requires a metal joint at the corners of the assembly. Since the extruded door sections are hollow a joint must be made at the front and rear of the seam which is formed when two sections are brought together. Thus, in order to manufacture a door there are eight welds to be made. The very nature and use to which the door is to be put requires that the joints formed be secure and yet pleasing in appearance.

Prior to the invention aluminum door sections were welded by hand. The average operator welding manually could weld some 40 or 50 doors in an eight hour shift. The weld quality from one door to the next was not always consistent. With the machine of the invention, approximately 250 doors can be welded in one eight hour shift with consistently good weld quality.

Accordingly, the main object of this invention is to provide a machine and a method of making good quality welds in metal doors with a minimum of operator skill and effort.

Another object is to provide a method of welding metal door sections wherein positive weld bead penetration is obtained from the very start of the weld.

Other objects will become apparent from the following disclosure and drawings in which:

FIGURE 1 is a perspective view of the machine of the invention;

FIGURE 2 is a left hand side view of the machine;

FIGURE 3 is a partial top view showing the limit switches which initiate and terminate the welding operation;

FIGURE 4 is a side view of the apparatus shown in FIGURE 3;

FIGURE 5 is a view partially in cross-section of the sensing element shown in FIGURE 1;

Figure 6:
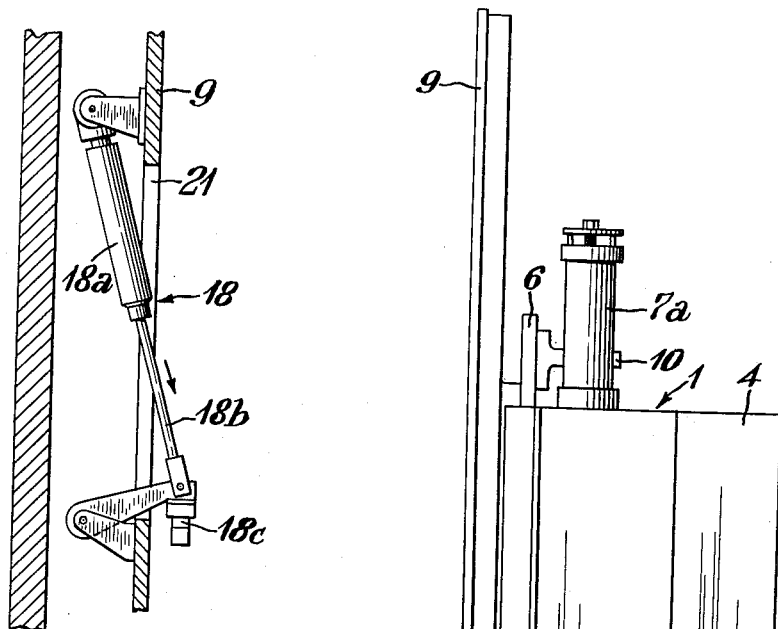
FIGURE 6 is a view of the clamp shown in FIGURE 1.
Figure 7:
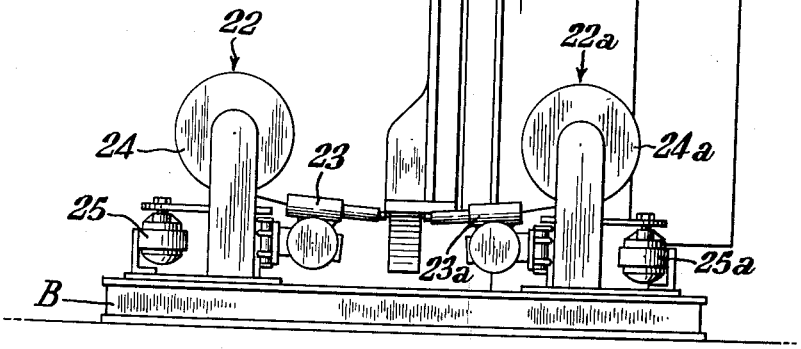
FIGURE 7 is a right hand side view of the machine shown in FIGURE 1.

FIGURES 10a, b, c, and d are illustrations of the type welds obtained with and without the inventive system;

FIGURES 11a and 11b are cross-sectional views of welds made with and without the inventive system.

The invention provides a novel process and machine for making good quality welds in the manufacture of metallic doors quickly, efficiently, and with more uniformly higher quality than was possible prior thereto.

The objects of the invention are accomplished in a general way by providing a welding machine which has a carriage mounted on a frame so as to be vertically movable thereon. The extruded metal sections to be welded are placed in juxtaposition on the carriage in a vertical plane with a mitered joint or seam formed at the intersection of the two extrusions. The sections placed on the vertical carriage of the machine are properly located and held in place thereon by workedge stops provided on the carriage. A pair of clamps are provided to engage and to symmetrically orient such sections about a common center plane so that any thickness variation in the door sections due to extrusion tolerance will be equally divided on each side of the center plane. The machine is equipped to accept two of the four extrusions required to make the door and to join these sections together by welding, with two separate welding units, both sides of the mitered corner simultaneously.

The invention also provides a novel process for arc welding the corner seams formed between two metallic door sections to be joined wherein the members to be joined are placed in juxtaposition in a vertical plane so as to form a corner mitered seam therebetween. A sigma short-circuiting type welding unit is provided adjacent the seam to be welded. The short-circuiting type weld is started at a relatively high voltage and current in order to obtain positive weld bead penetration at the very start of the weld. Relative motion is provided between the members to be joined and the welding unit. After a predetermined length of time, the high starting voltage and current are automatically reduced to normal welding voltage and current and the weld is continued in vertical direction until completion.

The machine of the invention will be described in more detail in referring to the various views in the drawings wherein like parts bear like reference characters.

In FIGURE 1, machine M is provided with a base B preferably constructed of steel and machined flat for the mounting of various components. The base B is adapted to be fixed in place to the floor. A vertical upright column 1 (see FIGURE 2) fabricated of steel is fastened to the base B. Mounted on the rear of the column 1 is the control cabinet 4 in which all the welding control panels and machine sequencing controls are housed. On the front face of column 1 mounted along the vertical length thereof are guide rails 5 (see also FIGURE 3). A carriage slide 6 fixed to be an integral part of the work carriage or table 9 is slideably mounted in the rails 5 so that the carriage 9 is capable of vertical up and down movement in rails 5 relative to column 1. Rigidly fixed to the column 1 are carriage travel cylinders C. One cylinder 7 fastened to the under side of the top surface 8 of column 1 is operably fastened through a bracket 10 to the slide 6 to provide the motive force necessary to raise and lower the carriage 9. A pneumatic counter weight cylinder 7a also operably fixed to the slide 6 provides a constant upward force on the carriage 9 such that the effective weight of the carriage is decreased and cylinder 7 can then move the carriage. Of course one larger cylinder could be used in place of cylinder 7 if desirable or expedient. The cylinder 7 used herein is of the air-hydraulic type wherein air provides the motivating force and a closed loop oil system provides the necessary speed regulation.

Mounted along one of the long and short edges of the work carriage 9 are a plurality of workedge stops. Some of the stops 11a, 11b, 11c, and 11d bear upon the outer edge of the extrusions to be joined while the others 11e, 11f, and 11g are provided with a series of nylon elements which bear upon the respective sides of the extrusions.

Figure 8:
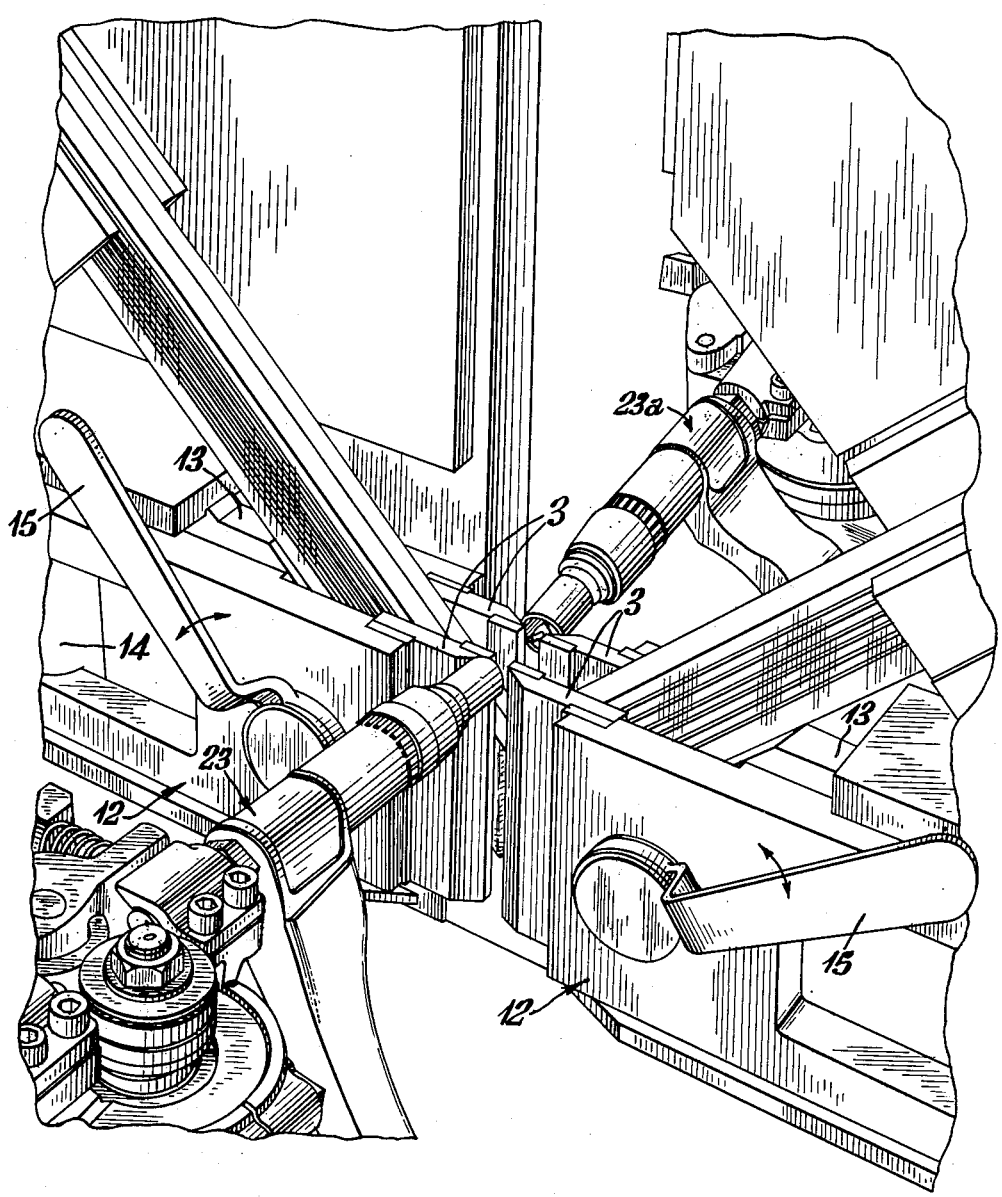
FIGURE 8 is an exploded view of the machine of FIGURE 1 in the area of the weld.

Positioned at the corner of the carriage 9 where the extrusions to be joined come together to form a miter seam is a V notch locator 13 (see FIGURE 8) which insures that the extrusions are at the proper angle to be joined. Built about the locator 13 are clamps 12. One clamp grips each of the extrusions to be joined. The clamps 12 consist of a pair of jaws 3—3 pivotally mounted at 14 and joined by a left hand-right hand washer so that each jaw moves symetrically toward or away from each other as the handle 15 is rotated. This clamp arrangement ensures that the two extrusions to be welded are aligned with respect to their center lines and thus compensates for extrusions of different thicknesses so that the difference in thickness of one extrusion relative to the other extrusion is split on either side of the center line. In the vicinity of the weld, the clamps 12 and locator 13 are constructed of non-magnetic material so as to prevent magnetic disturbances of the welding arc. These clamp components which bear on the extrusions are of a ceramic or like material since these elements must be non-conductors of heat or electricity. If these parts do conduct any appreciable heat, the uneven bearing pressure due to the extrusion shape, results in uneven weld penetration. Whereas, if these elements conducted electricity, the welding filler wire would tend to arc and fuse to them. With clamp elements made of material of the above description, the spacing of the clamps across the weld can be made equal to the width of the weld bead with the result that no smut or discoloration is made on the parts along the sides of the weld.

An aperture 16 is provided in the carriage 9 adjacent the workedge stop 11b. Mounted on the back side of the carriage 9 and adapted to extend through the aperture 16 is a sensing element 17. Sensing element 17 (see FIGURE 5) consists of a probe 17b carrying a cam 17c and is operated by an air cylinder 17a so as to move the probe 17b forward through the aperture 16. As the probe 17b moves forward, cam 17c will trip a limit switch 17s. The tripping of this switch determines whether the front or rear welding unit mounted on the base B will make the long weld as will be described in more detail hereinafter in referring to the electrical circuit diagram. If the front of the extrusion is facing the carriage 9, the probe 17b cannot move forward and limit switch 17s will not be actuated. As shown in FIGURE 5, the face of the extrusion E is away from the carriage 9 so that the probe 17b has tripped the limit switch 17s.

Another aperture 21 is provided in carriage 9 adjacent workedge stop 11c. Part clamp 18 is pivotally mounted at the back of carriage 9 so as to extend through the aperture 21 and clamp the extrusion to the table in order to insure electrical grounding of the extrusion to the table. The clamp 18 (see FIGURE 6) consists of cylinder 18a into which extension arm 18b is telescopically slideable. A clamping head 18c is pivotally carried by the extension arm 18b and is adapted to grip the extrusion and secure it to the carriage 9.

Since the welding operation on hollow extrusions requires the front and back thereof to be fabricated simultaneously, two welding units 22 and 22a are adjustably mounted on base B so as to oppose each other. The units are adjustable to allow for extrusion of different thicknesses. Each welding unit comprises a welding head 23 and 23a, a wire reel bracket 24 and 24a and a torch oscillator mechanism 25 and 25a. The oscillator mechanisms provide eccentric adjustments for oscillation amplitude and centering while the welding heads 23 and 23a provide adjustment for torch angulation. The welding heads are in a spaced fixed relation so as to minimize the number of adjustments required during production.

As was mentioned above, because of the geometry of the hollow extrusion, a long weld has to be made in the front thereof while a shorter weld has to be made at the back. The sensing element 17 orients the machine by sending a signal to the welding units so that the appropriate welding unit will be primed to make the long weld. For example, as shown in FIGURE 5, the front of the extrusion E is away from the carriage 9 so that the probe 17b of the sensing element 17 is fully extended. Therefore, a signal is sent to the welding unit 22 at the front of the machine and this unit is now primed to make the long weld.

Because of the difference is weld lengths, the welding unit which makes the long weld must be actuated first but both welding units must be stopped at the same time. A cam and switch arrangement A (see FIGURES 3 and 4) mounted at the back of carriage 9 is provided for this purpose.

The cam arrangement A includes two cams 26 and 27 which are provided with slots 28 through which set screws 29 are provided to make adjustments in the vertical position of the cams 26 and 27. This adjustment determines the length of the weld to be at the mitred joint. For example, assume cam 26 is adjusted to be in a higher position than cam 27, as the carriage 9 moves in the vertical up direction, cam 26 will trip limit switch 30. The switch 30 will then actuate the welding unit 22 which was previously primed by sensing element 17 to make the long weld. Cam 27 will subsequently trip the limit switch 31 which will then actuate the welding unit 22a which is to make the short weld. In order that both welding units stop at the same time, a block 32 is positioned between cams 26 and 27 such that the wheel 33 and 34 of limit switches 30 and 31 will ride on the block 32 and fall off at exactly the same time thus opening the switches 30 and 31 and deactivating the welding units 22 and 22a.

One of the major advantages of the invention is the penetration control which is obtained over the entire length of the weld.

Characteristically, a mechanized inert gas shielded seam weld does not have full penetration at the start. Full penetration is not realized until the temperature of the base material increases to the equilibrium point between heat input from the welding arc and heat withdrawal into the base material and fixturing. This means that for a short distance at the start of a sigma seam weld the filler metal piles up on the top surface of the base metal without penetrating.

The penetration control is required for welding the doors because the top of the weld bead is milled off for a decorative effect. Without penetration control, the milling would remove the weld strength from the start of the weld. The start of the weld is made at the inside corner of the door frame which is the point of highest stress concentration when the door is in use. This effect is especially noticeable in FIGURES 10a, b, c, and d, and 11a and b. In FIGURE 10a and 10b, the weld was made without using penetration control. Notice the lack of uniform weld bead configuration in FIGURE 10b especially during the initiation of the weld cycle. In contrast, FIGURE 10c and 10d made with the inventive penetration control is uniform and consistent throughout. Now referring to a profile weld bead in FIGURE 11a, the bead without penetration control has poor coalescence at the start of the weld cycle. Also note that there is no penetration at the start of the weld. Note FIGURE 11b exhibiting complete uniformity and penetration throughout.

Both higher current and voltage must be used for proper control of penetration. Higher voltage alone would lengthen and widen the arc and while producing some increase in penetration, would form an excessively wide weld puddle. An attempt to use high enough current to accomplish the desired result without a corresponding increase in voltage would result in an unusable arc condition.

In order to obtain full penetration at the start of the weld, in the case of aluminum door frames for example, the voltage used at the start was about 15½ volts with about 85 amperes. The high current and voltage were applied for a short, controlled time; about ¾ second. The voltage and current are then automatically cut back to 12½ volts and 55 amperes, respectively, while the weld was being made at a speed of 16 i.p.m. While the weld is being made, the head 23 is oscillated transverse to the weld seam in order to produce a weld of desired width. In this particular case, the amplitude of oscillation was 3/16 inch at 140 c.p.m. (cycles per minute).

Figure 9:
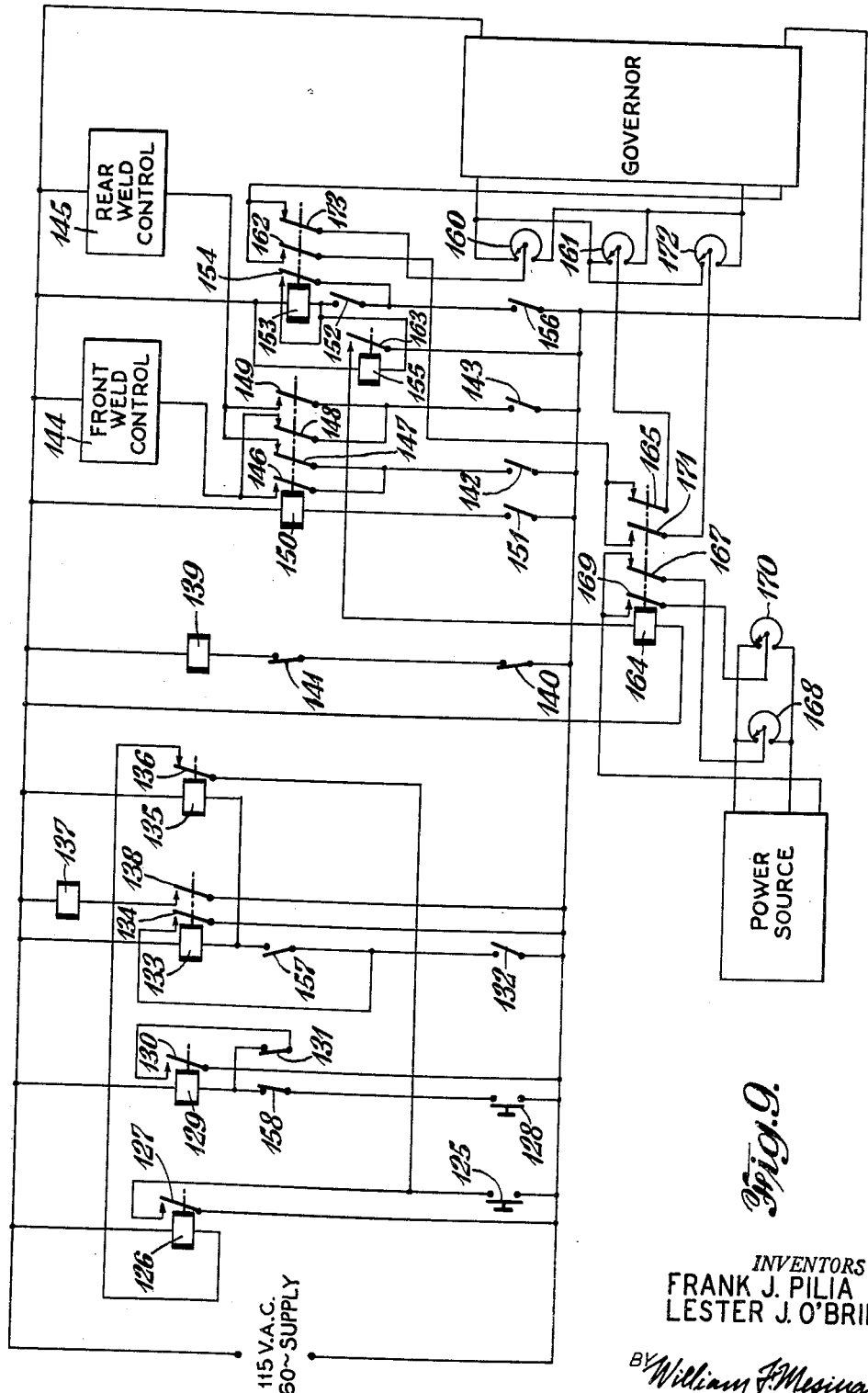
FIGURE 9 is a schematic wiring diagram of some of the control circuits associated with the machine.

In order that those skilled in the art may more fully understand the invention, the sequence of operation will now be described in referring to the circuit diagram shown in FIGURE 9.

After the machine control is placed in the automatic mode for subsequent sequencing, by turning the sequencing switch to automatic, the operator places the parts to be welded on to the machine and manually clamps them in and then presses the extend clamp pushbutton 125. The extend clamp relay 126 is energized through normally closed contacts 136 of clamp time delay 135 which brings in the pneumatic clamp 18 and sensing element 17 described above. The extend clamp relay 126 is locked-in by the closing of its contacts 127 so that the extend clamp pushbutton 125 may be released without deenergizing the extend clamp relay 126. Next, the operator presses the cycle start pushbutton 128 and the table down relay 129 is energized through normally closed limit switch contact 158 and is locked-in by its contacts 130 around the cycle start pushbutton. Limit switch contacts 158 and 157 are part of the limit switch 158a shown in FIGURE 3. The carriage 9 moves down to the bottom of its stroke at which point normally closed limit switch contact 131 is opened which de-energizing the table down relay 129 and normally open limit switch contact 132 closes which energizes the master start relay 133 through limit switch contact 157 which is closed by the carriage 9 when it reaches the bottom of its stroke. Limit switch contacts 131 and 132 are part of limit switch 131a (see FIGURE 3). The master start relay 133 is locked-in by a set of its contacts 134 around limit switch contacts 132. The clamp time delay 135 is also energized through limit switches contacts 132 and 157. When the clamp time delay 135 times out the extend clamp relay 126 is de-energized by the opening of contacts 136. The carriage up relay 137 is energized by the closing of contacts 138 associated with the master start relay 133 and the carriage 9 moves upward at high speed since the rapid feed relay 139 is energized through normally closed limit switches contacts 140 and 141. The limit switch contacts 140 and 141 are open by the cams 26 and 27 and are the contacts in limit switches 30 and 31 shown in FIGURE 3. Consequently, the rapid feed relay is de-energized so that the fluid of the hydraulic speed control system flows through the internal metering orifice of carriage cylinder 7 and thereafter the carriage 9 moves upward at a reduced speed for welding. The limit switch contacts 142 and 143 which are closed by cams 26 and 27 energize the front and rear welding controls 144 and 145 through the contacts 146, 147, 148, and 149 of the length control relay 150. The condition of the length control relay 150 is determined by the limit switch contacts 151 which is part of the sensing element 17 shown in FIGURE 5. For example, when the long weld is to the front, the probe 17b of sensing element, as it moves forward, actuates limit switch contacts 151 to energize the length control relay 150. One of the cams 26 and 27 is adjusted to determine the length of the long weld and this cam actuates the limit switch with contacts 140 and 142. When the length control relay 150 is energized, length control relay contacts 146, 147, 148, and 149 switch the front welding control 144 to the control of the cam which is adjusted for the long weld. The rear welding control 145 is energized as soon as the limit switch contacts 143 are closed by the other of the cams 26 or 27. The welding filler wire feeds from the front torch until it contacts the workpiece. At this time, the welding current flows energizing a welding current relay (not shown) so that welding current relay contacts 152 close energizing the transfer relay 153 and the hot start time delay 155 through contacts 156 of anti-stick-time delay timer located in the welding controls 144 and 145. The hot start time delay 155 times the duration of the initial high current and voltage. A set of transfer relay contacts 154 lock-in around the current relay contacts 152 to prevent interruption in the energizing of the hot start time delay 155. When transfer relay 153 is energized, normally open contacts 162 close and normally closed contacts 173 open to change the control of the rate of feed of the filler wire from the inching potentiometer 160 to the hot start current potentiometer 161. When the hot start time delay times out, contacts 163 close energizing hot start transfer relay 164. The hot start transfer relay contacts 165 and 171 operate to transfer the wire feed speed from the hot start current potentiometer 161 to the welding current potentiometer 172. This provides the wire feed speed which determines the current for actual welding. It should be noted that this portion of the circuit is located in both the front and rear welding controls. The hot start transfer relay 164 at the same time transfers the voltage settings on the welding power supply from the high start voltage potentiometer 168 to the welding voltage potentiometer 170 through the operation of contacts 167 and 169. These potentiometers are located in the main control unit but act remotely to control power supply voltage.

The above description is the same for both the front and rear welding units. Both welds progress until the cams 26 and 27 return the limit switch contacts 140, 141, 142, and 143 to their normal positions. The front and rear welding controls 144 and 145 are then de-energized and the weld cycle stop at the same time the rapid speed relay is energized and the carriage travels up at a rapid speed to the cycle start position at which point the limit switch contacts 157 open de-energizing the master start relay 133 and the table up relay 137. Limit switch contacts 158 closes resetting the control for the next cycle.

It is to be understood that minor modifications may be made to the apparatus described or in the arrangement thereof without departing from the spirit and scope of the invention and that the description herein given of the preferred embodiment is in no way to be construed as limiting the inventive concept; for example, the carriage could remain stationary while the welding units are made to move vertically.

What is claimed is:

1. Process of arc welding corner seams formed between two metallic members to be joined which comprises positioning said members to be joined in juxtaposition, so as to form a corner mitered seam therebetween; providing a welding unit adjacent the seam to be welded; causing relative movement between said metallic members to be joined and said welding unit prior to initiating the welding operation; starting a weld at a relatively high voltage and current in order to obtain positive weld bead penetration at the very start of the weld; automatically reducing the relatively high voltage and current to normal welding voltage and current after a predetermined interval of time; and continuing said weld along said mitered seam at normal welding voltage and current to thereby produce a mitered corner weld that has uniform weld penetration along the entire length of the weld.

2. Process of arc welding corner seams formed between two metallic members to be joined which comprises positioning said members to be joined in juxtaposition in a vertical plane so as to form a corner mitered seam therebetween; providing a sigma type welding unit adjacent the seam to be welded; causing relative movement between said members to be joined and said welding unit in a vertical direction prior to initiating the welding operation; starting a short-circuiting type sigma weld at a relatively high voltage and current in order to obtain positive weld bead penetration at the very start of the weld; automatically reducing the relatively high voltage and current to normal welding voltage and current after a predetermined interval of time; and continuing said short-circuiting type sigma weld in a vertical direction along said mitered seam at normal welding voltage and current to thereby produce a mitered corner weld that has uniform weld penetration along the entire length of the weld.

3. A process of arc welding corner seams formed between two hollow aluminum door members to be joined which comprises positioning said aluminum door members in juxtaposition in a vertical plane so as to form a corner mitered seam at the front and rear of said hollow aluminum door members; providing a sigma short-circuiting type welding unit adjacent the seam formed at the front of said hollow aluminum door member and another sigma short-circuiting type welding unit adjacent the seam formed at the rear of said hollow aluminum door members; causing relative movement between said aluminum door members and said sigma short-circuiting type welding units in a vertical direction prior to initiating the welding operation; starting a short-circuiting type sigma weld at a relatively high voltage and current at both the front and rear seams formed between said hollow aluminum door members in order to obtain positive weld bead penetration at the very start of said weld; automatically reducing the relatively high voltage and current to normal welding voltage and current after a predetermined interval of time; and continuing said short-circuiting type sigma weld in a vertical direction along said mitered seams at normal welding voltage and current to thereby produce mitered corner welds that have uniform weld penetration along the entire length thereof.

4. A welding machine comprising in combination a base; an upright column member supported by said base; a carriage moveably mounted on said upright column for vertical movement thereon; workedge stops carried by said carriage for locating thereon door sections to be welded; a pair of clamps provided on said carriage and being adapted to engage and symetrically orient such sections about a common center plane; a welding unit fixed to said base adjacent said clamps and including means for feeding a wire electrode toward such sections to be welded, and means for oscillating said welding unit transversely with respect to the weld joint to be made to produce a desired weld bead configuration; means for starting the welding process at an initial high voltage and current; and circuit means for reducing said initial high voltage and current to normal welding voltage and current at a predetermined time.

5. An aluminum door welding machine comprising in combination a base; an upright column member supported by said base; a carriage moveably mounted on said upright column for vertical movement thereon; workedge stops carried by said carriage for locating thereon door sections to be welded; a pair of clamps provided on said carriage and being adapted to engage and symetrically orient such sections about a common center line; a sigma short-circuiting type welding unit fixed to said base adjacent said clamps and including means for feeding a wire electrode toward such sections to be welded, and means for oscillating said welding unit transversely with respect to the weld joint to be made to produce a desired weld bead configuration; means for starting the welding process at an initial high voltage and current; and circuit means for reducing said initial high voltage and current to normal welding voltage and current at a predetermined time.

6. A welding machine comprising in combination a base; an upright column member supported by said base; a carriage mounted on said upright column; workedge stops carried by said carriage for locating thereon door sections to be welded; a pair of clamps provided on said carriage and being adapted to engage and symetrically orient such sections about a common center plane; a welding unit mounted on said base adjacent said clamp and including means for feeding a wire electrode toward such sections to be welded; means for causing relative movement between said welding unit and said carriage; means for oscillating said unit transversely with respect to the weld joint to be made to produce a desired weld bead configuration; means for starting the welding process at an initially high voltage and current; and a circuit for reducing said initially high voltage and current to normal welding voltage and current at a predetermined time.

References Cited in the file of this patent

UNITED STATES PATENTS

| | | |
|---|---|---|
| 1,831,343 | Caldwell | Nov. 10, 1931 |
| 2,441,748 | Black | May 18, 1948 |